(12) United States Patent
Turner et al.

(10) Patent No.: US 11,244,560 B2
(45) Date of Patent: Feb. 8, 2022

(54) REMOTE VEHICLE SYSTEM CONFIGURATION, CONTROL, AND TELEMATICS

(71) Applicant: VOXX INTERNATIONAL CORPORATION, Hauppauge, NY (US)

(72) Inventors: James S. Turner, Mesa, AZ (US); Luc Samson, Saint-Jacques-le-Mineur (CA)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 17/211,702

(22) Filed: Mar. 24, 2021

(65) Prior Publication Data

US 2021/0264770 A1   Aug. 26, 2021

Related U.S. Application Data

(63) Continuation of application No. 16/900,804, filed on Jun. 12, 2020, now Pat. No. 10,964,205, which is a
(Continued)

(51) Int. Cl.
| | |
|---|---|
| *G08C 17/02* | (2006.01) |
| *H04L 12/40* | (2006.01) |
| *H04W 4/44* | (2018.01) |
| *G06F 8/61* | (2018.01) |
| *G06F 8/65* | (2018.01) |

(Continued)

(52) U.S. Cl.
CPC .............. *G08C 17/02* (2013.01); *B60R 25/24* (2013.01); *G06F 8/61* (2013.01); *G06F 8/65* (2013.01); *H04L 12/40* (2013.01); *H04W 4/40* (2018.02); *H04W 4/44* (2018.02); *B60R 25/01* (2013.01); *B60R 25/1003* (2013.01); *B60R 25/209* (2013.01); *B60R 25/33* (2013.01); *B60R 2325/101* (2013.01); *B60R 2325/205* (2013.01); *B60R 2325/40* (2013.01);
(Continued)

(58) Field of Classification Search
None
See application file for complete search history.

(56) References Cited

U.S. PATENT DOCUMENTS

| | | | | |
|---|---|---|---|---|
| 8,768,565 | B2 * | 7/2014 | Jefferies | G06Q 50/30 |
| | | | | 701/32.7 |
| 9,666,005 | B2 * | 5/2017 | Ellis | G07C 9/00309 |

(Continued)

*Primary Examiner* — Carlos Garcia
(74) *Attorney, Agent, or Firm* — Anatoly S. Weiser, Esq.; IPLCounsel.com

(57) ABSTRACT

A vehicle control system (VCS) includes external communication interfaces, such as a Bluetooth interface, for communicating with a user communication and control device, such as a smart phone or a tablet. The user is enabled to operate certain features of the vehicle, such as the remote start, power locks/trunk, climate control, and security features, through the smart phone. The VCS may also communicate with a remote server via the user's smartphone, for example, providing telematics data and receiving service reminders For display to the user on the smartphone, the VCS, or a display built into the vehicle. The VCS may be custom installed in the vehicle using, the user's or the installer's smartphone, without a physical connection from the VCS to the smartphone.

20 Claims, 4 Drawing Sheets

Related U.S. Application Data continuation of application No. 16/269,321, filed on Feb. 6, 2019, now Pat. No. 10,720,045, which is a continuation of application No. 15/862,630, filed on Jan. 4, 2018, now Pat. No. 10,249,182.

(51) Int. Cl.
| | |
|---|---|
| *B60R 25/24* | (2013.01) |
| *H04W 4/40* | (2018.01) |
| *B60R 25/20* | (2013.01) |
| *B60R 25/10* | (2013.01) |
| *B60R 25/01* | (2013.01) |
| *B60R 25/33* | (2013.01) |
| *H04W 4/80* | (2018.01) |

(52) U.S. Cl.
 CPC ........... *H04L 2012/40215* (2013.01); *H04L 2012/40273* (2013.01); *H04W 4/80* (2018.02)

(56) References Cited

U.S. PATENT DOCUMENTS

| | | | |
|---|---|---|---|
| 9,725,069 B2* | 8/2017 | Krishnan | E05B 77/00 |
| 9,911,255 B2* | 3/2018 | Lee | G07C 9/27 |
| 9,947,153 B2* | 4/2018 | Bergerhoff | G07C 9/00571 |
| 9,967,717 B2* | 5/2018 | Buttolo | B60R 16/037 |
| 2011/0112969 A1* | 5/2011 | Zaid | G06Q 50/30 |
| | | | 705/50 |
| 2014/0169564 A1* | 6/2014 | Gautama | G07C 9/00309 |
| | | | 380/270 |

* cited by examiner

REMOTE VEHICLE SYSTEM CONFIGURATION, CONTROL, AND TELEMATICS

CROSS-REFERENCE TO RELATED APPLICATION

This application is a continuation of and claims priority to U.S. patent application Ser. No. 16/900,804, entitled REMOTE VEHICLE SYSTEM CONFIGURATION CONTROL, AND TELEMATICS, filed November 2020, now allowed; which is a continuation of and claims priority' to U.S. patent application Ser. No. 16/269,321, entitled REMOTE VEHICLE SYSTEM CONFIGURATION, CONTROL, AND TELEMATICS, filed Feb. 6, 2019, now U.S. Pat. No. 10,720,045; which is a continuation of and claims priority to U.S. patent application Ser. No. 15/862,630, entitled REMOTE VEHICLE SYSTEM CONFIGURATION, CONTROL, AND TELEMATICS, filed Jan. 4, 2018, now U.S. Pat. No. 10,249,182, issued Apr. 2, 2019. Each of the above-referenced patent documents is incorporated by reference in its entirety as if fully set forth herein, including Specification, Figures, Claims, and all other matter.

FIELD OF THE DISCLOSURE

This disclosure relates generally to the field of wireless configuring and reconfiguring vehicle control systems, to wireless user control of vehicle systems, and to telematics information exchange between vehicles and remote servers.

BACKGROUND

Vehicle control systems are typically aftermarket electronic systems installed in vehicles for consumers' convenience The functionality provided by such systems may include remote start capability, control of security and convenience features, climate control, and others. Telematics systems include systems that allow monitoring of the vehicle usage and performance, and communicating with the vehicle and the user of the vehicle.

A need in the art exists for improved techniques for initially configuring and later reconfiguring vehicle control systems, for improved techniques for communicating with vehicle control systems, and for improved communication techniques with telematics systems.

SUMMARY

This document describes embodiments, variants, and examples implementing novel techniques for addressing one or more of the needs identified above, and/or other needs. Selected embodiments described in this document include methods, apparatus, and articles of manufacture that enable wireless configuration, reconfiguration, and user control of vehicle systems; and improved connectivity to remote servers.

In an embodiment, a vehicle control system (VCS) for installation in a vehicle includes a processor; an external wireless radio frequency (RF) interface; a memory module comprising non-volatile programmable memory and storing instructions for execution by the processor; an interface to vehicle systems; a remote start module; and a bus coupling the processor to the external wireless RF interface, the memory module, the vehicle systems interface, and the remote start module. The processor is configured to execute the instructions to read vehicle information that identifies the vehicle, to transmit through the external wireless RF interface the vehicle information to a user control and communication device (UCCD) to enable the UCCD to obtain configuration parameters for installation of the VCS in the vehicle, to receive through the external wireless RF interface the configuration parameters from the UCCD, to store the configuration parameters in the non-volatile programmable memory, and to configure the VCS in accordance with the configuration parameters.

In an embodiment, method of operating a vehicle control system (VCS) installed in a vehicle includes: reading vehicle information that identifies the vehicle from a memory of the vehicle; transmitting the vehicle information through an external wireless RF interface of the VCS to a user control and communication device (UCCD) to enable the UCCD to obtain configuration parameters for installation of the VCS in the vehicle; receiving through the external wireless RF interface the configuration parameters from the UCCD; storing the configuration parameters received from the UCCD in a non-volatile programmable memory of the VCS; and configuring the VCS in accordance with the configuration parameters.

In an embodiment, an article of manufacture includes at least one non-volatile machine-readable storage medium with program code stored in the at least one non-volatile machine-readable storage medium. When the program code is executed by a processor of a vehicle control system (VCS) installed in a vehicle, it configures the VCS to read vehicle information that identifies the vehicle from a memory of the vehicle; to transmit the vehicle information through an external wireless RF interface of the VCS to a user control and communication device (UCCD) to enable the UCCD to obtain configuration parameters for installation of the VCS in the vehicle; to receive through the external wireless RF interface the configuration parameters from the UCCD; to store the configuration parameters received from the UCCD in a non-volatile programmable memory of the VCS; and to configure the VCS in accordance with the configuration parameters.

In an embodiment, a mobile communication device stores machine-executable instructions, wherein the instructions configure the mobile communication device to: pair with a vehicle control system (VCS) installed in a vehicle through a radio frequency (RF) link; request vehicle information for configuring the VCS in the vehicle; transmit the vehicle information to a remote server; receive from the remote server information for configuring the VCS for the vehicle; receive from a user of the UCCD responses regarding configuration of the VCS in the vehicle: and transmit to the VCS through the RF link configuration parameters based on the responses and the information regarding configuration of the VCS.

Various features and aspects will he better understood with reference to the following description, drawings, and appended claims (if any).

DETAILED DESCRIPTION

The words "embodiment," "variant," "example," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words/expressions with their inflectional morphemes, as well as similar words and phrases, do not necessarily import an immediate or direct connection, but include within their meaning connections through mediate elements.

The expression "processing logic" should be understood as selected steps decision blocks and/or hardware/software/firmware for implementing the selected steps/decision blocks. "Decision block" means a step in which a decision is made based on some condition, and subsequent process flow is selected based on whether the condition is met or not.

Some definitions have been explicitly provided above. Other and further explicit and implicit definitions and clarifications of definitions may be found throughout this document.

Figure 1:
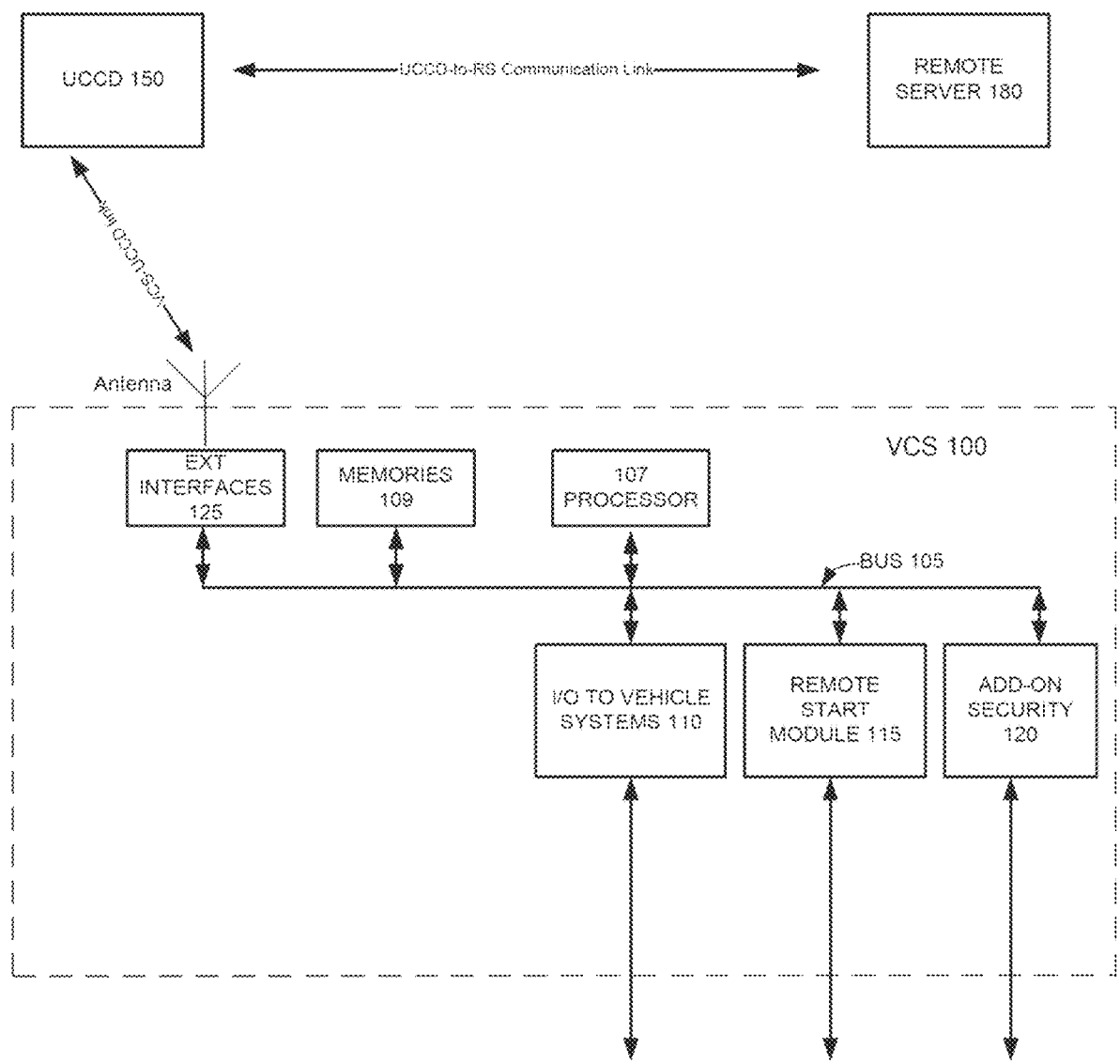
FIG. 1 illustrates selected components of a Vehicle Control System in communication with a User Control and Communication Device (such as a smart phone or tablet), configured in accordance with selected aspects described in this document.

FIG. 1 illustrates selected components of a vehicle control system ("VCS") 100 in communication with a user control and communication device ("UCCD") 150 and a remote server ("RS") 180. The VCS 100 may be for example, a remote start system (such as remote start systems of Directed Electronics, Inc.). The UCCD 150 may be for example, a portable handheld communication device such as a smartphone, a tablet, and a personal digital assistant; a computer such as laptop computer and a desktop computer. The "user" of the UCCD 150 may be the user of the vehicle, and/or the installer who installs/configures/re-configures the VCS 100 in the vehicle. The UCCD may execute an application ("app") for communicating with the VCS 100 and the RS 180. The application may be for allowing the user of the vehicle to control the vehicle, and/or to allow an installer to install/initialize/configure/re-configure the VCS 100. The RS 180 may be, for example, a cloud-based system; it may be configured to receive and analyze telematics data and provide functionality responsive to the telematics data, such as service reminders and warnings regarding the state of the vehicle.

The VCS 100 includes a bus 105 that provides communication/networking capability between and among the components of the VCS 100. The bus 105 may be, for example, a bus in accordance with one of the Controller Area Network standards, aka "CAN bus"; or a processor-based system bus.

The VCS 100 includes a processing module 107, for example, a microprocessor and supporting electronics. The VCS 100 also includes a memory module 109 that can store instructions executable by the processing module 107; the memory module 109 may include one or more memories of same or different types, such as ROMs, PROMs, EPROMS, EEPROMS, flash memories, optical disks, magnetic storage devices, and/or other memories. In embodiments, the memory module 109 includes at least some programmable, non-volatile memory.

The VCS 100 also includes an interface or interfaces 110 to vehicle control modules, for example, the following: an engine computer (engine control module or LCM); a transmission computer (transmission control module or TCM); built-in vehicle firmware; built-in security features of the vehicle: a telematics module and data storage for data that includes the vehicle's usage and performance data, such as OBD II data (which data storage may instead be included in a telematics module.

The VCS 100 also includes a remote start module 115, which allows starting of the vehicle by the VCS 100, in response to appropriate commands, for example, remote start commands received from a user of the UCCD 150, The remote start module 115 may also interact with the vehicle control modules through the interfaces 110, which the remote start module 115 may access through the bus 105.

The VCS 100 additionally includes add-on security module 120. which may connect to and monitor various sensors (e.g., shock/vibration, proximity, intrusion), and which may operate and/or control various convenience features (e.g., power windows, power locks, power seats, steering wheel telescoping and tilt positions, audio system presets and other audio system controls).

The VCS 100 further includes an external communication interface 125, which can be, for example, a Bluetooth interface. The interface 125 can provide communications between the UCCD 150 and the various components of the VCS 100 the remote start module 115, the interfaces 110 and the devices connected to the interfaces 110, the security module 120, and other VCS 100 components). The external communication interface 125 may also serve as a bridge between the UCCD 150 and the bus 105, and thus enable the UCCD 150 to communicate with other devices connected to the bus 105 directly (e.g., the remote start module 115, the add-on security module 120) and indirectly through the interfaces 110 (e.g., the engine control module, transmission control module, built-in vehicle firmware, built-in security features of id e vehicle, telematics module, usage and performance data storage).

In embodiments, the interface 125 may be another type of RF interface that enables vehicle communications to longer distances, for example, 1500 feet or one mile, and even longer distances: the other type of RF interface may operate, for example, on the 900 MHz band. In embodiments, the interface 125 is a Bluetooth interface, and the VCS 100 further includes another type of RF interface that enables vehicle communications to longer distances. for example, 1500 feet or one mile, and even longer distances; the other type of RF interface may operate, for example, on the 900

MHz band. In embodiments, the interface 125 is a Bluetooth interface and further includes the other type of RE interface and/or a cellular interflice that can communicate with the UCCD 150 and/or the remote server 180. In embodiments, however, the VCS 100 communicates with the RS 180 via the UCCD 150.

Figure 2:
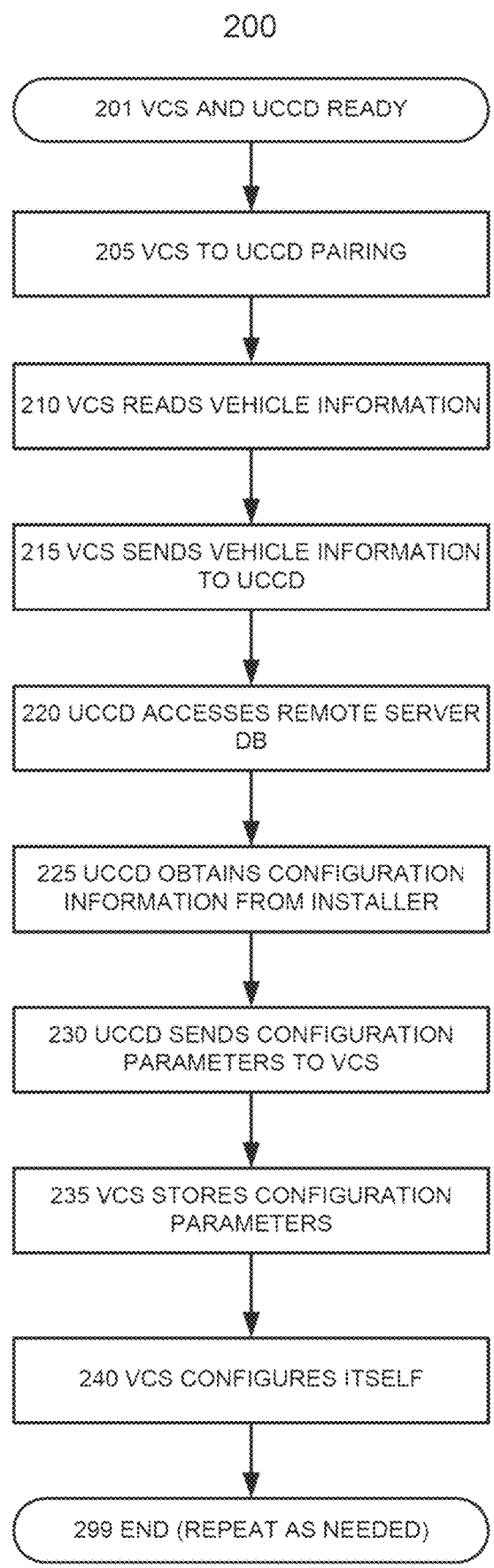
FIG. 2 illustrates selected steps of a process for configuring the Vehicle Control System for a particular vehicle and features, in accordance with selected aspects described in this document.

If the VCS 100 is an aftermarket system, it likely needs to he configured to operate properly when installed in a particular vehicle. If the VCS 100 is an OEM system, it may also need to be configured for the vehicle. FIG. 2 illustrates selected steps of a process 200 for configuring the VCS 100 for the particular vehicle and selected features of the VCS 100.

At flow point 201, the VCS 100 is physically installed in the vehicle and connected to its various systems, such as the power supply; sensors; ECM; TCM; vehicle firmware; built-in security features of the vehicle; telematics module; data storage for data that includes the vehicle's usage and performance data and other telematics data; controls for various convenience features (e.g., power windows, power locks, power seats, steering wheel telescoping and tilt positions, audio system presets and other audio system controls). Power from the vehicle is provided to the VCS 100. Additionally, the UCCD 150 (e.g., a smartphone or tablet) is powered up and is located within such range that it can communicate with the VCS 100 (e.g., through the external interface 125), and executes the installer application provided for the purpose of configuring the VCS 100 in the vehicle.

In step 205, the VCS 100 is put into a pairing mode with the UCCD 150. For example, the ignition of the vehicle can be turned on, and a valet button of the VCS 100 may be held down fur a predetermined period of time, to cause the VCS 100 to enter into the pairing mode, such as the Bluetooth pairing mode; the VCS 100 and/or the UCCD 150 may signal the user that the pairing has been accomplished. Thus, after the step 205, the UCCD 150 (here, the installer's device) can communicate with the VCS 100.

In step 210, the VCS 100 accesses the vehicle's systems (e.g., the ECM/TCM/firmware) to read the information sufficient to configure the functionality of the VCS 100 for the vehicle. The information typically includes at least the Vehicle Identification Number ("VIN") or equivalent information from which make, model, year, trim level, and vehicle options can be determined.

In step 215, the VCS 100 transmits to the UCCD 150 the information read in the previous step.

In step 220, the UCCD 150 communicates with the remote server (or one of the remote servers) 180 to obtain access to the database from which the make/model/trim/options and/or other information pertinent to the configuration of the VCS 100 is determined, based on the information from the step 210. The database may be a proprietary one, accessible only with appropriate authorization or credentials. After the installer's log-in (verifying the authorization/credentials), the remote server 180 reads the vehicle's information from the UCCD 150 and responds to the UCCD 150 with the information needed to configure the VCS 100 for the vehicle; the information may include identification of the correct firmware for the vehicle, and/or the correct firmware itself.

In step 225, the installer's app running on the UCCD 150 guides the installer in configuring the VCS 100, based oil the information received from the remote server 180. The installer may be presented with choices and requests for information and for selections. The installer's responses may be stored on the UCCD 150.

In step 230, the installer's app executing on the UCCD 150 sends the installer's responses and/or appropriate information derived from the responses and the information obtained from the RS 180 database (the configuration parameters) to the VCS 100.

In step 235, the VCS 100 stores the configuration parameters of the VCS 100 in a memory of the VCS 100, such as the non-volatile memory of the memory module 109.

In step 240, the VCS 100 configures itself for the vehicle, based on the configuration parameters. In this step, the VCS 100 may also write information into the vehicle's firmware or other systems, to complete the matchup between the VCS 100 and the vehicle.

The process may then terminate at flow point 299.

Figure 3:
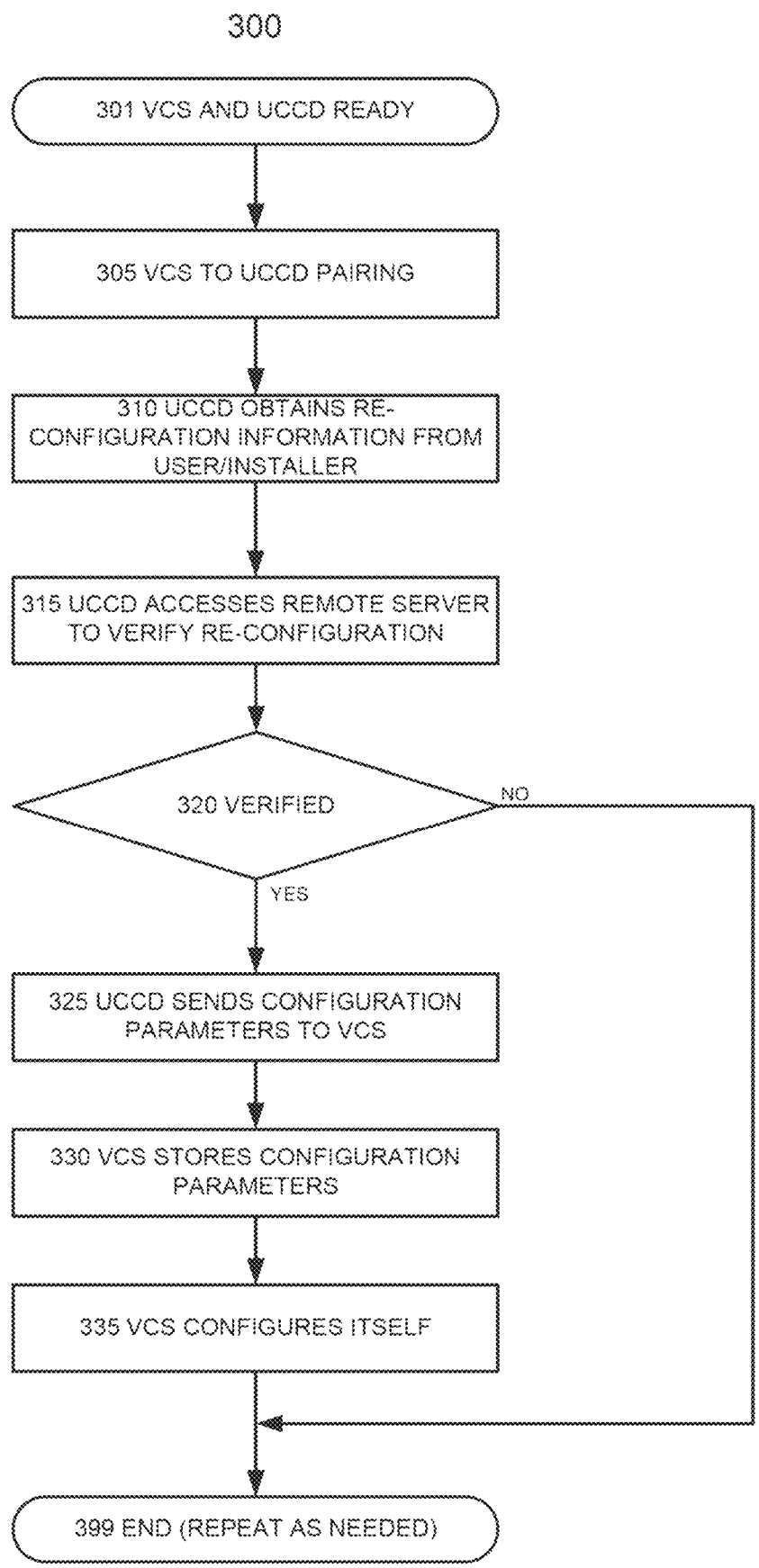
FIG. 3 illustrates selected steps of a process for changing parameter configuration of the Vehicle Control System, in accordance with selected aspects described in this document.

The user of the vehicle and/or the installer may wish to change some of the configuration parameters at a later time, that is, after the initial installation. This might he the case, for example, if the user decides to purchase additional Femmes of the VCS 100 or related services, to add accessories, to increase runtime for remote start, or for other reasons. The process for re-installing the VCS 100 or changing the configuration parameters may be quite similar to the process 200 for initially configuring the VCS 100. FIG. 3 illustrates selected steps of a process 300 for changing the parameter configuration. The process 300 may use the installer's app or the end-user's app (the app of the user of the vehicle) executing on the UCD 100, if the end-user's app includes the appropriate functionality. To summarize, the VCS 100 and the UCCD 150 are put into a pairing mode (step 305), the app guides the end-user or the installer in re-configuring the VCS 100 (step 310), by presenting choices and requests for information and for selections. The end-user's or the installer's responses are stored on the UCCD 150. The UCCD 150 verifies the validity/permission for the new parameters with the remote server 180 (step 315, for example, verifying authorization for addition of new features/services or deletion of old ones). If verified (decision block 320), the UCCD 150 transmits the new configuration parameters to the VCS 100 (step 325); if not verified, the process ends (flow point 399), to be repeated as needed or desired. When the VCS 100 receives the new configuration parameters sent in the step 325, the VCS 100 stores the changed parameters in the non-volatile memory of the memory module 109 (step 330), and re-configures itself and possibly also the vehicle based on the changed parameters (step 335). The process then terminates in the flow point 399, to be repeated as needed or desired.

Note that in the process 300 there is no need to obtain the vehicle information from the database of the remote server 180, because the vehicle information is known from the time of the initial information. But in embodiments, the process also obtains the vehicle information and uses it as in the process 200.

Figure 4:
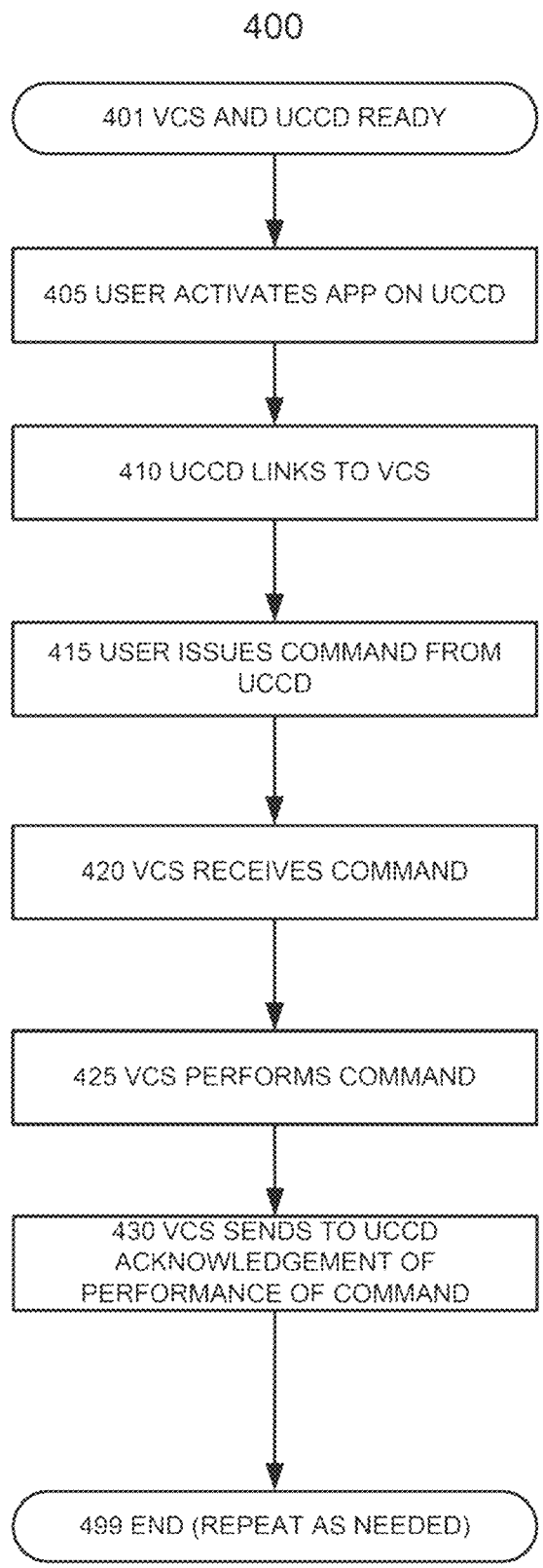
FIG. 4 illustrates selected steps of a process for controlling vehicle features through the User Control and Communication Device.

Once the VCS 100 is installed and configured, the end-user can control the vehicle using the end-user's UCCD 150, running an end-user application. The end-user app, once opened, may automatically pair with the VCS 100, through the Bluetooth or similar transceiver on the UCCD 150 and the external interface 125 of the VCS 100; the app may then display a command interface that allows the end-user to input commands, which the app transmits to the VCS 100. The commands may include controls of the security features of the vehicle (e.g., turn the security system on/off, clear an alarm), convenience features such as the remote start and temperature control, lights flashing and horn on/off, location interrogate (for receiving the vehicle's position at the UCCD 150, and others. FIG. 4 illustrates selected steps of a process 400 for controlling the vehicle features through the UCCD 150 app and the VCS 100.

At flow point 401, the VCS 100 is installed in the vehicle, configured (e.g., through the process 200)), and powered up (as it would typically be regardless of the presence or position of the vehicle's key). Additionally, the VCS 100 is connected to the UCCD 150 through the external interface 125 (or one or more of the interfaces 125); and the end-user app is available on the powered up UCCD 150, which is within communication range of the VCS 100. Note that the communication range may include any cellular service accessible location, when the interface 125 is or includes a cellular interface that can communicate with the UCCD 150.

In step 405, the user activates the app on the UCCD 150, for example, by tapping on the app's icon.

In step 410, the app establishes a communication link (such as a cellular link, a Bluetooth another RF link) with the interface 125 of the VCS 100. This may be done automatically upon activation of the app, or require some deliberate action of the end-user.

In step 415, the user issues a command from the app/UCCD 150, for example, by tapping on a particular icon of the app. In response, the app sends a corresponding signal to the VCS 100. The signal corresponds to the icon and may instruct the VCS 100, for example, to start the vehicle remotely, to turn on the climate control system of the vehicle and/or set the temperature of the climate control system, to activate the horn and/or siren, to flash headlights, to lock/unlock the vehicle's doors, to activate panic mode of the vehicle, and to perform any other function for which the vehicle and the VCS 100 are configured; these, of course, are just examples of the available functionalities.

In stop 420 the VCS 100 receives the command.

In step 425, the VCS 100 performs the function corresponding to the command.

In step 430, the VCS 100 sends to the UCCD 150 an acknowledgement of the performance of the command.

At flow point 499 the process terminates, to be repeated as needed or desired.

The presence of the communication link between the VCS 100 and the UCCD 150 with the end-user app allows the VCS 150 to communicate with the remote server 180, for example, transmitting to the remote server 180 telematics data and receiving data and firmware updates from the remote server 180. Thus, in operation, the end-user app may run on the UCCD 150, at least occasionally (e.g., continuously, continually, at predetermined times or intervals, at random times), establishing the RF link (such as the Bluetooth link or 900 MHz link) with the VCS 100. When the link is established, the VCS 100 may transmit to the app/UCCD 150 telematics and/or other data, for subsequent transmission from the app/UCCD 150 to the remote server 180; and the app/UCCD 150 may transmit to the VCS 100 data and/or firmware updates and or interrogation request from the remote server 180.

The features described throughout this document may he present individually, or in any combination or permutation, except where the presence or absence of specific features (elements/limitations) is inherently required, explicitly indicated, or otherwise made clear from the description. This applies whether or not features appear related to specific embodiments.

Although the process steps and decisions (if decision blocks are present) may be described serially in this document, certain steps and/or decisions may he performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may he coupled to one or more processors so that the one or more processors can read information from, and write information to, the storage medium or media. In an alternative, the storage medium or media may be integral to one or more processors.

This document describes in detail the inventive apparatus, methods, and articles of manufacture for configuring/reconfiguring and using a vehicle control system. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A vehicle control system (VCS), comprising:
   a processing module;
   a cellular interface coupled to the processing module;
   instruction storage storing machine-executable instructions, the instruction storage being, coupled to the processing module to enable the processing module to read and execute the instructions;
   VCS configuration storage coupled to the processing module to enable the processing module to store and read VCS configuration information; and
   an interface to vehicle systems coupled to the processing module to enable the processing module to access vehicle systems of a vehicle in which the VCS is installed and to read vehicle data of the vehicle;

wherein, when the processing module executes the instructions, the processing module configures the VCS to:

read the vehicle data from one or more of the vehicle systems, transmit using the cellular interface at least some of the vehicle data to a user mobile device to enable the user mobile device to obtain configuration parameters for installation of the VCS in the vehicle, receive using the cellular interface the configuration parameters from the user mobile device, store the configuration parameters in the VCS configuration storage, and configure the VCS in accordance with the configuration parameters.

2. The vehicle control system of claim 1, wherein the interface to vehicle systems comprises a Controller Area Network (CAN) interface.

3. The vehicle control system of claim 1, wherein the at least some vehicle data transmitted to the user mobile device comprises a unique identifier of the vehicle.

4. The vehicle control system of claim 1, wherein, when the processing module executes the instructions, the processing module further configures the VCS to read telematics data through the interface to vehicle systems and to transmit the telematics data to a remote server using the cellular interface.

5. The vehicle control system of claim 1, wherein, when the processing module executes the instructions, the processing module further configures the VCS to receive user commands through the cellular interface and, in response to each user command received through the cellular interface, execute a function corresponding to said each user command.

6. A combination of the vehicle control system of claim 1 and a program storage device storing a mobile device app for installing the VCS.

7. A combination of the vehicle control system of claim 1 and the user mobile device.

8. A combination of the vehicle control system of claim 1 and a remote server, wherein:

the remote server is a cloud-based server; and when the processing module executes the instructions, the processing module further configures the VCS to read telematics data through the interface to vehicle systems and to transmit the telematics data to the remote server.

9. A combination of the vehicle control system of claim 1, the user mobile device, and a remote server, wherein, when the processing module executes the instructions, the processing module further configures the VCS to read telematics data through the interface to vehicle systems and to transmit the telematics data to the remote server.

10. The vehicle control system of claim 1, wherein, when the processing module executes the instructions, the processing module further configures the VCS to receive through the cellular interface re-configuration parameters from the user mobile device, to store the re-configuration parameters in the VCS configuration storage, and to re-configure the VCS from a first configuration in accordance with the configuration parameters to a second configuration in accordance with the re-configuration parameters.

11. The vehicle control system of claim 10, wherein, when the processing module executes the instructions, the processing module further configures the ICS to receive user commands from the user mobile device and, in response to each user command received from the user mobile device, execute a VCS function corresponding to said each user command.

12. The vehicle control system of claim 11, wherein the user commands comprise a remote start command corresponding to a function of starting an engine of the vehicle.

13. The vehicle control system of claim 11, wherein the user commands comprise a climate control command corresponding to a function of a climate control system of the vehicle.

14. The vehicle control system of claim 11, wherein the user commands comprise a first climate control command corresponding to turning on a climate control system of the vehicle, and a second climate control command corresponding to setting a temperature on a climate control system of the vehicle.

15. The vehicle control system of claim 11, wherein the user commands comprise a command corresponding to sounding a horn of the vehicle.

16. The vehicle control system of claim 11, wherein the user commands comprise a command corresponding to turning on a light of the vehicle.

17. The vehicle control system of claim 11, wherein the user commands comprise a first command corresponding to locking the vehicle and a second command corresponding to unlocking the vehicle.

18. The vehicle control system of claim 11, wherein the user commands comprise a first command corresponding to closing an access opening of the vehicle and a second command corresponding to closing the access opening.

19. A method of operating a vehicle control system (VCS) installed in a vehicle, the method comprising:

reading vehicle information that identifies the vehicle from vehicle systems of the vehicle;

transmitting the vehicle informations using a cellular interface of the VCS to a user mobile device to enable the user mobile device to obtain configuration parameters for installation of the VCS in the vehicle;

receiving the configuration parameters from the user mobile device;

storing the configuration parameters received from the user mobile device in the VCS; and configuring the VCS in accordance with the configuration parameters.

20. An article of manufacture comprising at least one non-volatile machine-readable storage medium with instructions stored in the at least one non-volatile machine-readable storage medium, the instructions, when executed by a processing module or a vehicle control system (VCS) installed in a vehicle configure the VCS to read vehicle data that identifies the vehicle tram vehicle systems of the vehicle;

transmit the vehicle data using a cellular interface of the VCS to a user mobile device to enable the user mobile device to obtain configuration parameters for installation of the VCS in the vehicle;

receive the configuration parameters from the user mobile device;

store the configuration parameters in the VCS; and configure the VCS in accordance with the configuration parameters.

* * * * *

UNITED STATES PATENT AND TRADEMARK OFFICE
CERTIFICATE OF CORRECTION

PATENT NO. : 11,244,560 B2
APPLICATION NO. : 17/211702
DATED : February 8, 2022
INVENTOR(S) : James S. Turner et al.

Page 1 of 1

It is certified that error appears in the above-identified patent and that said Letters Patent is hereby corrected as shown below:

In the Claims

Column 8, Line 60, in Claim 1, cancel "being, coupled" and replace the cancelled text with --being coupled--;

Column 10, Line 36, in Claim 19, cancel "informations" and replace the cancelled text with --information--;

Column 10, Line 50, in Claim 20, cancel "module or a vehicle" and replace the cancelled text with --module of a vehicle--;

Column 10, Line 52, in Claim 20, cancel "tram" and replace the cancelled text with --from--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*